(12) United States Patent
Smet et al.

(10) Patent No.: US 11,790,611 B2
(45) Date of Patent: Oct. 17, 2023

(54) VISUAL EDITOR FOR DESIGNING AUGMENTED-REALITY EFFECTS THAT UTILIZE VOICE RECOGNITION

(71) Applicant: Meta Platforms, Inc., Menlo Park, CA (US)

(72) Inventors: Stef Marc Smet, London (GB); Hannes Luc Herman Verlinde, Ruislip (GB); Michael Slater, Nottingham (GB); Benjamin Patrick Blackburne, Baldock (GB); Ram Kumar Hariharan, Kirkland, WA (US); Chunjie Jia, Bothell, WA (US); Prakarn Nisarat, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/138,096

(22) Filed: Dec. 30, 2020

(65) Prior Publication Data
US 2022/0207833 A1    Jun. 30, 2022

(51) Int. Cl.
| G06T 19/00 | (2011.01) |
| G06F 3/0481 | (2022.01) |
| G10L 15/22 | (2006.01) |
| G06F 3/04815 | (2022.01) |

(52) U.S. Cl.
CPC ........ *G06T 19/006* (2013.01); *G06F 3/04815* (2013.01); *G10L 15/22* (2013.01); *G10L 2015/223* (2013.01)

(58) Field of Classification Search
CPC ... G06T 19/006; G06F 3/04815; G10L 15/22; G10L 2015/223
See application file for complete search history.

(56) References Cited

U.S. PATENT DOCUMENTS

| 9,836,691 B1 | 12/2017 | Narayanaswami |
| 10,175,980 B2 | 1/2019 | Temam |
| 10,534,607 B2 | 1/2020 | Temam |

(Continued)

OTHER PUBLICATIONS

Dettmers, Deep Learning in a Nutshell: Core Concepts, pp. 1-10, 2020.

(Continued)

*Primary Examiner* — Michelle Chin
(74) *Attorney, Agent, or Firm* — Baker Botts L.L.P.

(57) ABSTRACT

A computer-implemented method, comprising, by an artificial-reality (AR) design tool: receiving, through a user interface (UI) of the AR design tool, instructions to add a voice-command module to an AR effect, the voice-command module having an intent type and at least one slot, the slot associated with one or more entities; establishing, according to instructions received through the UI, a logical connection between the slot and a logic module configured to generate the AR effect depending on a runtime value associated with the slot; and generate, for the AR effect, an executable program configured to: determine that a detected utterance corresponds to the intent type and includes one or more words associated with the slot; select, based on the one or more words, one of the one or more entities as the runtime value for the slot; send the runtime value to the logic module according to the logical connection.

18 Claims, 8 Drawing Sheets

(56) References Cited

U.S. PATENT DOCUMENTS

| | | | |
|---|---|---|---|
| 11,081,104 B1* | 8/2021 | Su | G06F 40/216 |
| 2015/0073798 A1* | 3/2015 | Karov | G06F 16/36 |
| | | | 704/243 |
| 2018/0293221 A1* | 10/2018 | Finkelstein | G06N 20/00 |
| 2019/0034172 A1 | 1/2019 | Kostello | |
| 2019/0103101 A1 | 4/2019 | Danila et al. | |
| 2019/0303110 A1 | 10/2019 | Brude | |
| 2020/0005128 A1 | 1/2020 | Temam | |
| 2020/0118564 A1* | 4/2020 | Moniz | G10L 15/26 |
| 2021/0117623 A1* | 4/2021 | Aly | G10L 15/063 |
| 2021/0383800 A1* | 12/2021 | Pair | G10L 15/1815 |

OTHER PUBLICATIONS

Jiao, et al., High-Performance Machine Learning, 2020 IEEE, pp. 136-138, Feb. 18, 2020.

International Search Report and Written Opinion for International Application No. PCT/US2021/065179 dated Apr. 5, 2022, 11 pages.

* cited by examiner

VISUAL EDITOR FOR DESIGNING AUGMENTED-REALITY EFFECTS THAT UTILIZE VOICE RECOGNITION

TECHNICAL FIELD

This disclosure generally relates to an editor for designing computer-generated effects that utilize voice recognition.

BACKGROUND

Augmented reality provides a view of the real or physical world with added computer-generated sensory inputs (e.g., visual, audible). In other words, computer-generated or virtual effects augment or supplement the real-world view. For example, a mobile phone with a camera may capture a real-world scene and display a composite of the captured scene with computer-generated objects. The visual objects may be, for example, two-dimensional and/or three-dimensional objects.

The conventional process for designing an augmented reality effect may be time consuming and labor-intensive. An augmented reality design, at a high level, comprises art work to be displayed (e.g., drawings or computer-rendered objects) and software instructions for controlling how the art work would appear in the augmented-reality scene. The design process for an augmented-reality effect typically requires several iterations of designing and modifying the art work and the software instructions in order to fine tune the desired effect. The process may be further complicated since the artist and programmer are usually different persons. Thus, a typical design flow may require, e.g., designing an art work by an artist, integrating the art work into an effect by a programmer, assessing the result, having the artist and/or the programmer refine the art work and/or the software instructions, and repeating until the desired augmented-reality effect is achieved.

In operation, after an augmented-reality effect has been designed, objects appearing in the effect may be rendered by end-user devices (e.g., smart phone, tablet, laptop, desktop, etc.). The objects, which may be defined in three-dimensional space, may be processed or rendered one by one. Typically, the rendering order may be based on the objects' distance from the viewer or the display region. For example, if a scene on Mars includes a red filter, smoke, and an astronaut placed in that order in three-dimensional space from the viewer, the three objects may be rendered in that same sequence (e.g., closer objects may be rendered first).

Augmented-reality effects may be displayed through a variety of devices. For example, augmented-reality effects may be displayed on a user's mobile phone, tablet, laptop, computer monitor, television, or any other display devices. However, different display devices may have different aspect ratios, resolution, display orientations, and/or other display features. Even if an augmented-reality effect is displayed as desired on one device in a particular viewing mode, it may not display as desired on a different device or in a different viewing mode.

SUMMARY OF PARTICULAR EMBODIMENTS

Innovative aspects of the subject matter described in this specification may be embodied in a computer-implemented method, comprising, by an artificial-reality (AR) design tool: receiving, through a user interface (UI) of the AR design tool, instructions to add a voice-command module to an AR effect, the voice-command module having an intent type and at least one slot, the slot associated with one or more entities; establishing, according to instructions received through the UI, a logical connection between the slot and a logic module configured to generate the AR effect depending on a runtime value associated with the slot; and generate, for the AR effect, an executable program configured to: determine that a detected utterance corresponds to the intent type and includes one or more words associated with the slot; select, based on the one or more words, one of the one or more entities as the runtime value for the slot; and send the runtime value to the logic module according to the logical connection.

Other embodiments of these aspects include corresponding systems, apparatus, and computer-readable mediums.

These and other embodiments may each optionally include one or more of the following features. For instance, customizing the voice-command module, including: receiving, through the UI, one or more additional entities for the slot; and configuring the slot to be associated with the one or more additional entities. Selecting further comprising: selecting, based on the one or more words, one of the one or more additional entities as the runtime value for the slot. Customizing the voice-command module, including: receiving, through the UI, an additional slot for the voice-command module; configuring the additional slot to be associated with one or more additional entities; and establishing, according to instructions received through the UI, an additional logical connection between the additional slot and the logic module. Generating the executable program further comprises: determine that the detected utterance corresponds to the intent type and includes one or more words associated with the additional slot; select, based on the one or more words, one of the one or more additional entities as the runtime value for the additional slot; and send the runtime value to the logic module according to the logical connection. Receiving, through the UI, a selection indicating synonyms of the one or more entities of the slot; and configuring the slot to be associated with the one or more entities and the synonyms of the one or more entities. Generating the AR effect based on the runtime value received over the logical connection.

DESCRIPTION OF EXAMPLE EMBODIMENTS

The present disclosure discusses an augmented-reality (AR) design tool that provides creators an easy-to-use feature for adding voice command modules into AR effects. The creator can interact with the AR design tool to create/edit/update the voice command module. The voice command module can include an intent type and slots, with entities being associated with the slots by the creator within the AR design tool. The creator can generate a (logical) connection between the voice command module and an AR affect module. When the voice command module detects an utterance that corresponds to the intent and includes words of the slot, an entity is selected based on the slot, and the AR affect module can generate the AR effect correspondingly.

For a real-world example of an end user (user of a device that can implement an AR application), the user can provide an utterance of "put on blue glasses." The AR application executing the aforementioned workflow processes the utterance as described above, can identify the corresponding AR effect, and update the user interface of the device to display the "blue glasses" AR effect.

Figure 1:
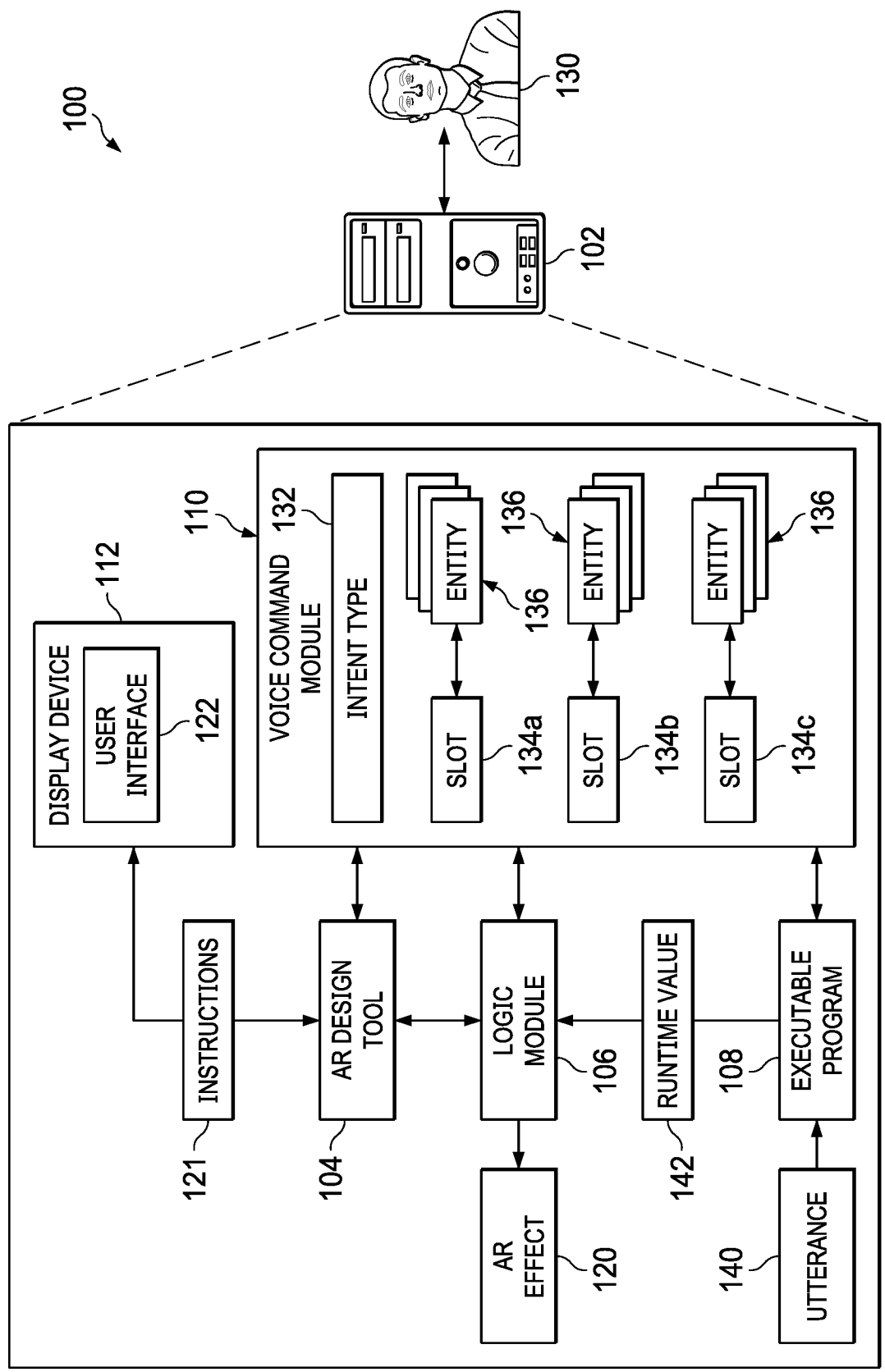
FIG. 1 illustrates an example system for a visual editor for designing augmented-reality effects that utilize voice recognition.

FIG. 1 illustrates a computing environment 100 including a computing system 102. The computing system 102 can include an augmented reality (AR) design tool 104, a logic module 106, a computer language executable program 108, a voice command module 110, and a display device 112. The AR design tool 104 can be in communication with the logic module 106, the voice command module 110, and the display device 112. The logic module 106 can be in communication with the AR design tool 104, the executable program 108, and the voice command module 110. The executable program can be in communication with the logic module 106 and the voice command module 110. The voice command module 110 can be in communication with the AR design tool 104, the logic module 106, and the executable program 108.

A user 130 associated with the computing system 102 can interact with the AR design tool 104 to generate an AR effect 120, described further herein.

The AR design tool 104 can be implemented as an augmented-reality design editor for designing augmented-reality effects. The AR design tool 104 can be a composition and integration tool through which objects may be visually incorporated into an augmented-reality (AR) effect 120 and modified based on real-time feedback of the current state of the design. The AR design tool 104 provides a graphical user interface (UI) 122 displayed by the display device 112 that allows visual editing of the objects and effects in the design.

Figure 2A:
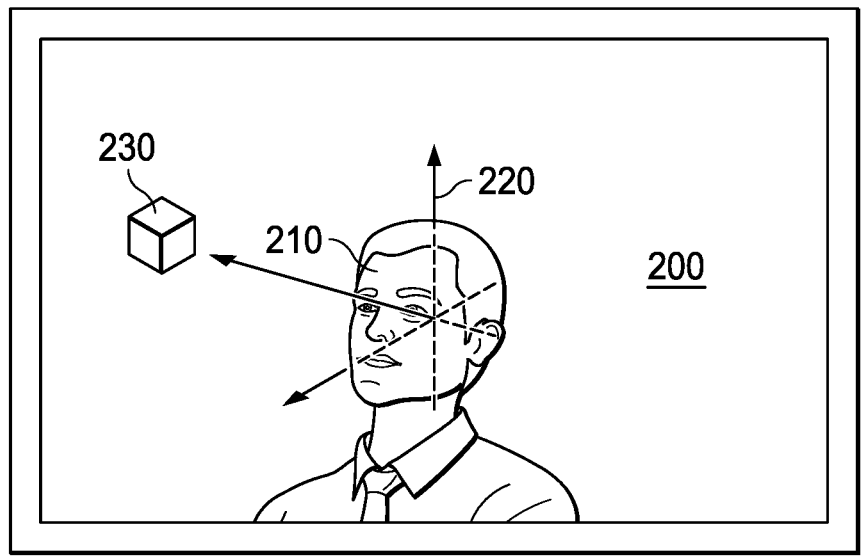
FIGS. 2A, 2B illustrate an example user interface of an augmented-reality design editor.
Figure 2B:
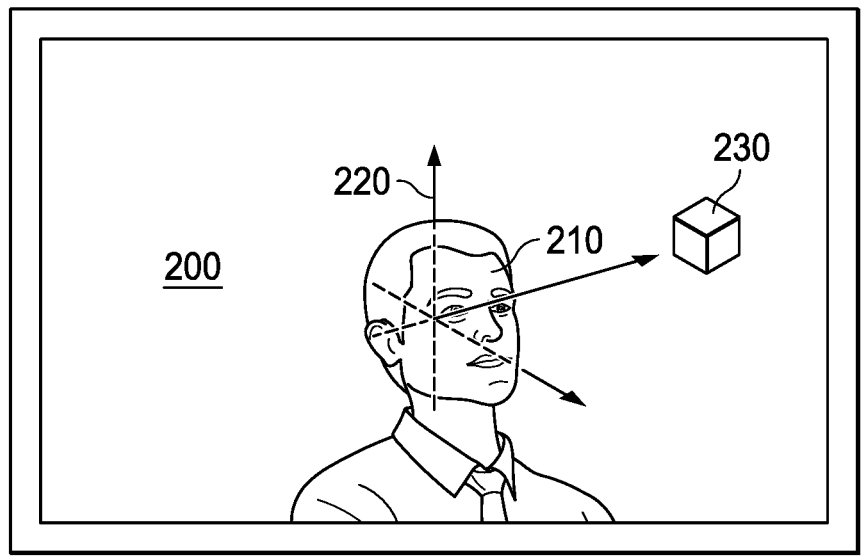

FIGS. 2A and 2B illustrate example face trackers that can be generated by the AR design tool 104 for addition to AR design. Specifically, a tracker may be a software-implemented tool that may be used in an augmented-reality design to track particular objects and/or motions appearing in a video scene. The AR design tool 104 support different types of trackers, such as trackers for a person's face, body, head, hand, expression, and gestures, as well as trackers for other types of animals (e.g., dogs, cats) and objects (e.g., cars, background, wall). The example shown in FIG. 2A utilizes a face tracker 220.

In some examples, a user (e.g., the user 130) can add a tracker to an augmented-reality design by, for example, selecting the desired type of tracker, dragging-and-dropping a tracker onto an object (e.g., a person's face 210) shown in the video 200, or through any other suitable user-input interface. In some examples, based on the type of tracker selected, the AR design tool 104 may monitor the video for the type of object that the tracker is configured to track (e.g., face, hand, etc.). For example, a 64-point facial rig may be used to detect and track a person's face. In some examples, for each tracker added to the design, the AR design tool 104 can monitor the entire video display or a region of the video display for the target object. Upon detecting such an object, the AR design tool 104 can associate the appropriate tracker with the object to track that object's movements. A tracker can track any feature(s) of an object, such as movement, position, orientation, color, shape, pattern, etc. A tracker can have a fixed position within the video display (e.g., at particular x-y coordinates). As another example, a tracker's position and/or orientation within the video display can be defined relative to the tracked object. For instance, the tracker's position may overlap or coincide with the tracked object and its orientation can mimic that of the tracked object. As another example, a tracker may be positioned n pixels (or other distance measures) from the center of the tracked object and its instantaneous position and/or orientation may depend on the orientation of the tracked object (e.g., if the user is looking up, the tracker may be positioned n pixels above the user's face; if the user is looking forward, the tracker may be positioned n pixels in front of the user's face). This relative position can be maintained as the object moves (e.g., changes position and/or orientation). In some examples, the relative position of a tracker can be defined by the user through a drag-and-drop mechanism using the object shown in the video as the reference point. In some examples, a tracker may also be associated with another tracker. For example, a first face tracker can be positioned n pixels to the left of a person's face, and a second tracker can be positioned m pixels above the first tracker. In some examples, any number of trackers may be added to an augmented-reality design, any number of trackers may be associated with an object, and any number of trackers may be associated with another tracker.

A tracker may be displayed in the video to provide visual cues as to the position and orientation of the tracker. For example, a tracker may be displayed as a facial mesh or mask, a three-dimensional Cartesian axis (e.g., the tracker 220 shown in FIGS. 2A and B), or any other suitable visual representations. The displayed tracker may move according to movements of the tracked object. For example, as the tracked object changes position and/or orientation, the displayed tracker may change position and/or orientation accordingly (e.g., following the user's face or maintaining a defined relative position; rotating to reflect the orientation of the tracked object, etc.). In the illustrated examples in FIGS. 2A and 2B, the tracker 220 changes its position and orientation according to the changed position/orientation of the person's face 210. In particular embodiments, a display of the tracker may be added to the video in real-time while the video is being displayed. In particular embodiments, the displayed tracker may also be a user interface for changing the position, orientation, and other properties of the tracker and/or any associated objects. For example, the user may drag-and-drop a tracker (e.g., displayed as a three-dimensional Cartesian axis) to adjust the position and/or orientation of the tracker or any associated objects that are defined relative to the tracker.

In particular embodiments, the user may also add any number of objects to the augmented-reality design in real-time while the video is being displayed. In the illustrated examples shown in FIGS. 2A and 2B, the object 230 is a three-dimensional cube. In particular embodiments, the user may import an object definition (e.g., an image file, a 3D object model, etc.) into the AR design tool 104 (e.g., from a file, server, another application, etc.). For example, an object may be a 2D image, a 3D object, a mask, a mesh, a plane, a line, a null object (e.g., only displayed during the design but not in the final product), or any other visual artifacts. While certain objects may be predefined, others may be dynamically generated based on detected features of the video. For example, a facial mask or mesh may be dynamically generated based on information from a 64-point facial rig so that its size, shape, and/or contour may match that of the detected face. In particular embodiments, the user may select any available object and add it to the augmented-reality design using any suitable user-input interface (e.g., through a menu selection, dragging-and-dropping, etc.). In particular embodiments, the selected object may be rendered and displayed in the video in real-time as the video is being played.

In particular embodiments, the user may associate any number of objects with one or more trackers. For example, in FIGS. 2A and 2B, the object 230 is associated with the tracker 220. In particular embodiments, the AR design tool 104 may display the selected object in the video in real-time while the video is being displayed. In particular embodiments, the object may move within the video according to the movements of the associated tracker. For example, as the tracker changes position and/or orientation (as a result of movements by the tracked object), the associated object may change position and/or orientation accordingly. In particular embodiments, an object may be attached to a tracker such that the object's position and/or orientation coincides with that of the tracker. For example, a facial mask may follow a user's face based on a facial tracker so that the facial mask appears to be worn by the user. In particular embodiments, an object may have a defined position and/or orientation relative to the associated tracker. For example, FIGS. 2A and 2B show the object 230 maintaining a distance and orientation relative to the tracker 220. In particular embodiments, an object may also be an animation, which may be triggered by certain triggering events detected by an associated tracker. For example, a facial mask object may blink and open its mouth upon the tracker detecting corresponding facial movements by the tracked faced. As another example, augmented tears may be shown flowing out of the user's eyes upon detection of the user making a sad face (e.g., based on detection of a frown or downwardly-curled lips). As yet another example, an object may have a defined movement pattern, such as a ball orbiting around the associated tracker.

In particular embodiments, the AR design tool 104 may provide various options for editing the augmented-reality design in real time. In particular embodiments, an object may be adjusted directly through the user interface 122 while it is being displayed in the video. For example, the AR design tool 104 may allow an object's size, aspect ratio, orientation, position, behavior and other features to be viewed and adjusted. For instance, the user may use a drag-and-drop mechanism to visually adjust an object's size, position, or orientation. Since the object is being displayed while adjustments are made, the designer is provided with constant real-time feedback of how the object appears. In particular embodiments, the AR design tool 104 may also provide designers the option to edit code associated with behaviors of augmented-reality effects. For example, the AR design tool 104 may provide a panel through which code (e.g., JavaScript) governing the behavior of effects may be edited. In particular embodiments, code may be edited while the video and associated trackers and objects are being displayed. Once the code has been updated, the user may apply the changes and immediately see how the augmented-reality behaves as a result. In particular embodiments, the AR design tool 104 may also provide various predefined effect options, such as different types of transition between frames, tracker templates with preconfigured positions (e.g., two face trackers with preconfigured positions), interactivity between objects and trackers (e.g., certain predefined facial expressions may trigger certain effects), among others.

Referring back to FIG. 1, in some implementations, the AR design tool 104 can receive, through the UI 122, instructions 121 to add the voice-command module 110 to the AR affect 120. The voice command module 110 can include an intent type 132 and slots 134a, 134b (collectively referred to as slots 134). Each of the slots 134 can be associated with one or more entities 136. In some examples, the user 130 can customize the voice-command module 110. Specifically, the AR design tool 104 can receive, through the UI 122, one or more additional entities 136 for a particular slot 134. The user 130, implementing the AR design tool 104, can configure the particular slot 134 to be associated with the one or more additional entities 136.

In some implementations, the AR design tool 104 can establish, according to the instructions 121 received through the UI 122, a logical connection between a slot 134 and the logic module 106. For example, the AR design tool 104 can establish, according to the instructions 121, a logical connection between the slot 134a and the logic module 106. The logic module 106 can be configured to generate the AR effect 120 depending on a runtime value associated with the slot 134a. For example, the runtime value associated with the slot 134a can include one of the entities 136 associated with the slot 134a.

The AR design tool 104 can generate the executable program 108 for the AR effect 120. The executable program 108 can be configured to determine that a detected utterance 140 corresponds to the intent type 132 and includes one or more words associated with the slot 134. For example, the detected utterance 140 can be provided by a user executing the executable program 108; and the executable program 108 can determine that the utterance 140 corresponds to the intent type 132 and includes words associated with the slot 134a. The executable program 108 can detect the utterance 140 using voice recognition (natural language processing), described further below with reference to FIG. 4. Further, the executable program 108 can be configured to select, based on the one or more words, one of the one or more entities 136 as a runtime value 142 for the slot 134. For example, the executable program 108 can be configured to select, based on the one or more words of the detected utterance 140, one of the entities 136 as the runtime value 142 for the slot 134a.

In some examples, the executable program 108 can be configured to select, one of the one or more additional entities 136 (that the user 130 provided through the UI 122 to customize the voice-command module 110) as the runtime value 142 for the slot 134a.

The AR design tool 104 can send the runtime value 142 to the logic module 106 according to the logical connection. That is, the AR design tool 104 sends the runtime value 142 to the logic module 106 per the logical connection between the slot 134 and the logic module 106. For example, the AR design tool 104 sends the runtime value 142 to the logic module 106 per the logical connection between the slot 134a and the logic module 106—e.g., the runtime value 142 being a value of one of the entities 136 associated with the slot 134a.

In some examples, the user 130 can further customize the voice-command module 110 by adding additional slots 134. Specifically, the user 130 can provide, and the AR design tool 104 can receive through the UI 122, an additional slot 134 for the voice-command module 110. For example, the AR design tool 104 can receive through the UI 122 an additional slot 134c for the voice command module 110. The AR design tool 104 can configure the additional slot 134c to be associated with one or more additional entities 136. The AR design tool 104 can establish, according to the instructions 121, an additional logical connection between the additional slot 134c and the logic module 106. In some examples, the executable program 108 can be configured to determine that the detected utterance 140 corresponds to the intent type 132 and includes one or more words associated with the additional slot 134a. Further, the executable program 108 can be configured to select, based on the one or more words, one of the one or more additional entities 136 as a runtime value 142 for the additional slot 134c. The AR design tool 104 can send the runtime value 142 to the logic module 106 according to the logical connection. That is, the AR design tool 104 sends the runtime value 142 to the logic module 106 per the logical connection between the additional slot 134a and the logic module 106. For example, the AR design tool 104 sends the runtime value 142 to the logic module 106 per the logical connection between the additional slot 134c and the logic module 106—e.g., the runtime value 142 being a value of one of the additional entities 136 associated with the additional slot 134c.

In some examples, the user 130 can provide a selection, and the AR design tool 104 can receive through the UI 122, indicating synonyms of the entities 136 of the slot 134. The AR design tool 104 can further configure the slot 134 to be associated with the entities 136 and the synonyms of the entities 136.

In some examples, the logic module 106 can generate the AR effect 120 based on the runtime value 142 received over the logical connection.

FIGS. 3A-3J illustrate the UI 122 through various stages/steps of implementing the AR design tool 104 for incorporating the voice command module 110 with the AR effect 120. Specifically, referring to FIG. 3A, the UI 122 can include a first section 302 and a second section 304. The first section 302 can include a portion 306 for defining a slot 134, including a type field 308 and a name field 310. In the current example, the type field 308 has the value "Variable" and the name field 310 has the value "Input." The first section 302 can include a portion 312 for defining the entities 136. The second section 304 can include a voice-command 320. The voice-command 320 can include the value of the name field 310, shown as 322.

The UI 122 can further include selectable phases—e.g., a configure interface element 350, and a test interface element 352. In the illustrated example, the configure interface element 350 is selected (e.g., by the user 130 interacting with the AR design tool 104) to place the AR design tool 104 and the UI 122 in the configure phase—e.g., a configure phase of the AR effect 120.

Figure 3A:
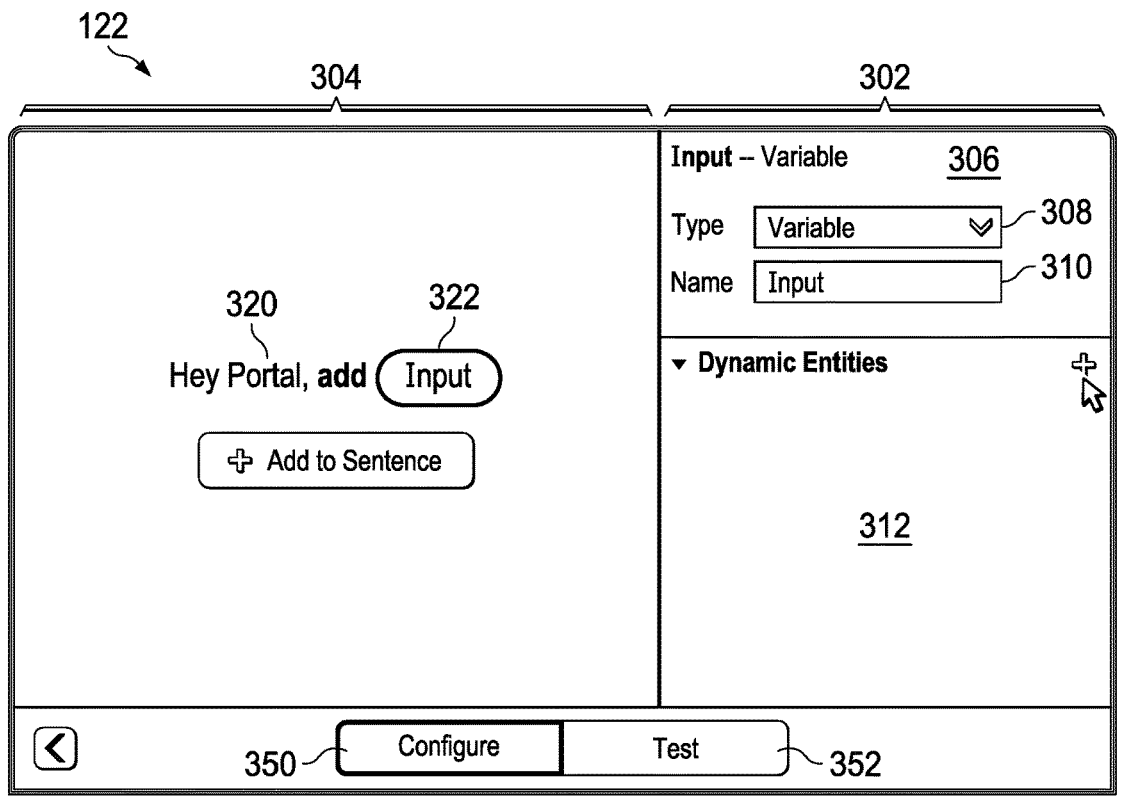
FIGS. 3A-3F illustrate graphical user interfaces of the augmented-reality design editor.
Figure 3B:
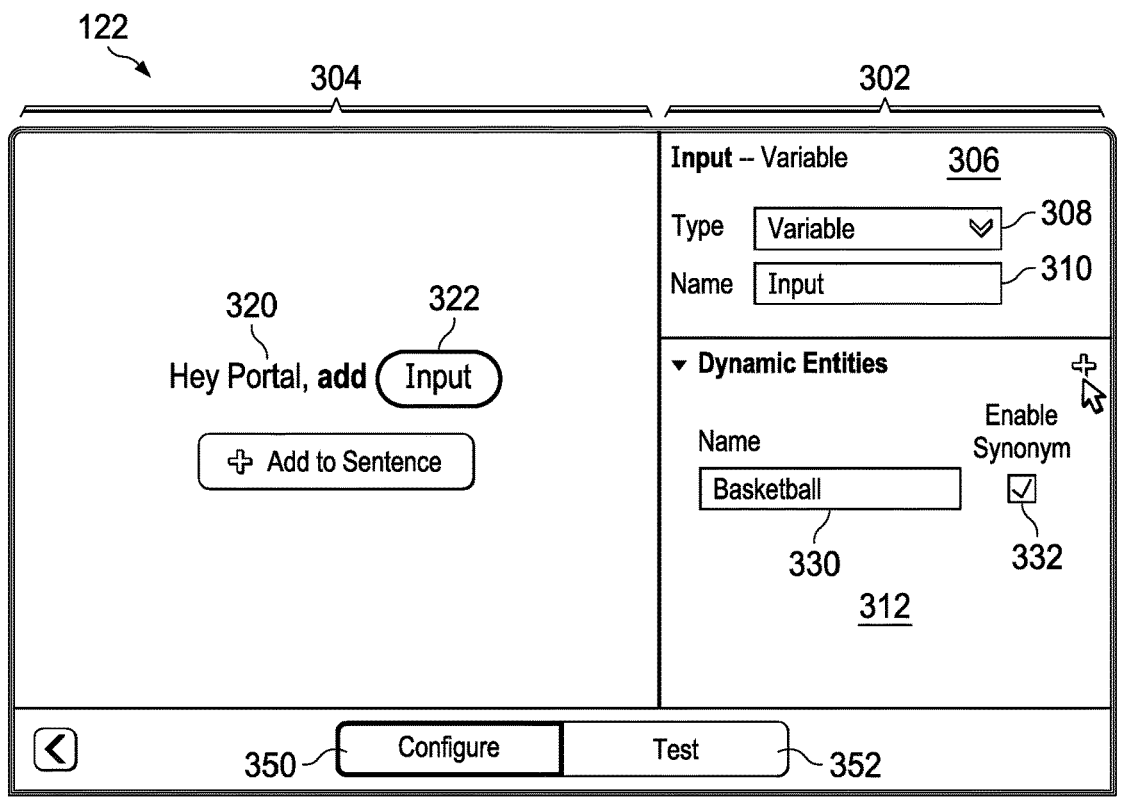

FIG. 3B illustrates the UI 122 after selection of adding an entity 136 for the slot 134, e.g., by the user 130 employing the AR design tool 104. In the illustrated example, the portion 312 has been updated to include the entity 136, including an entity name field 330 has a name of "Basketball." Additionally, the portion 312 can be updated to include a checkbox 332 for indication of synonyms that correspond to the value of the entity name field 330.

Figure 3C:
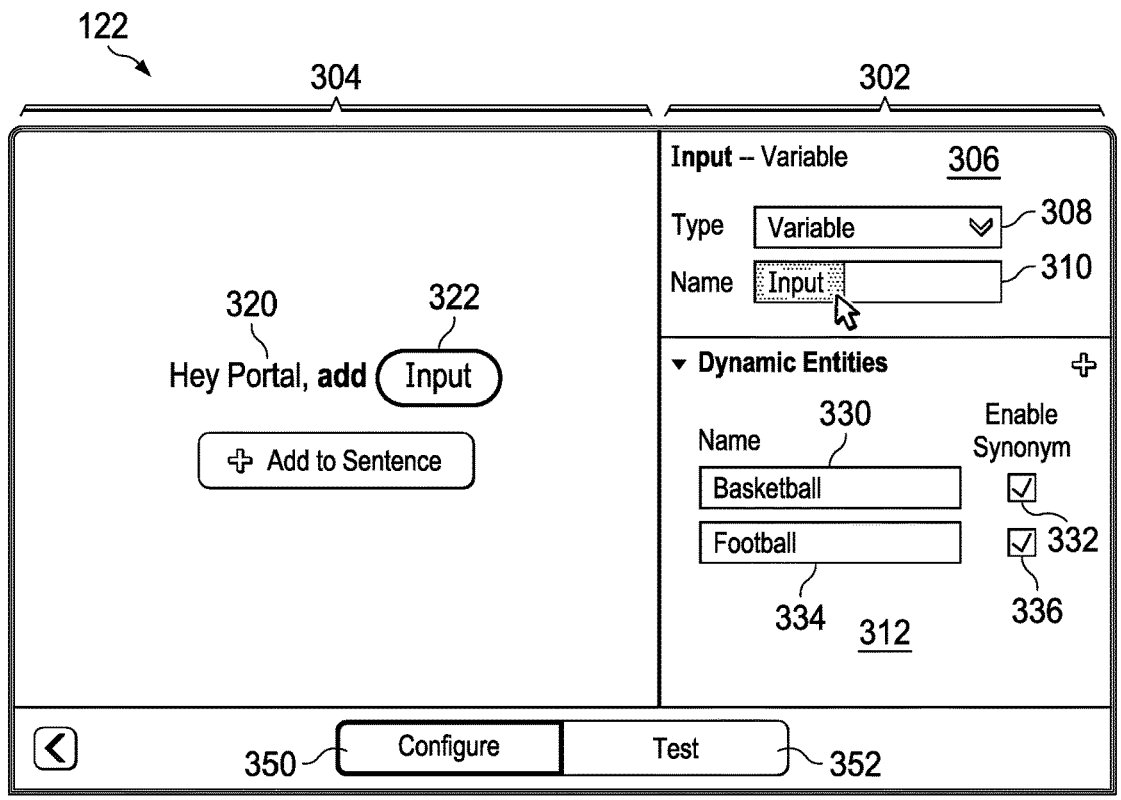

FIG. 3C illustrates the UI 122 after selection of adding an additional entity 136 for the slot 134, e.g., by the user 130 employing the AR design tool 104. In the illustrated example, the portion 312 has been updated to include the additional entity 136, including an entity name field 334 that has a name of "Football." Additionally, the portion 312 can be updated to include a checkbox 336 for indication of synonyms that correspond to the value of the entity name field 334.

Figure 3D:
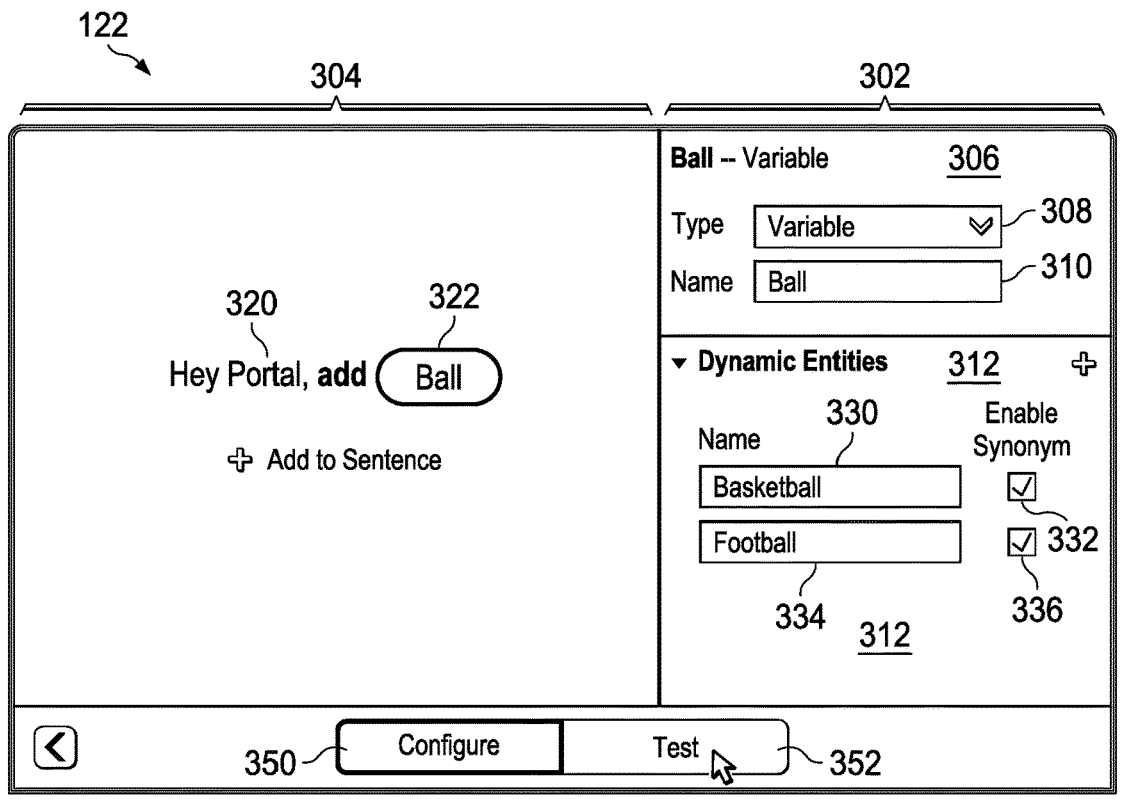

FIG. 3D illustrates the UI 122 after updating the name field 310 of the slot 134. In the illustrated example, the name field 310 has value of "Ball." Furthermore, the voice command 320 is updated correspondingly based on the updated name field 310, shown as 322.

Figure 3E:
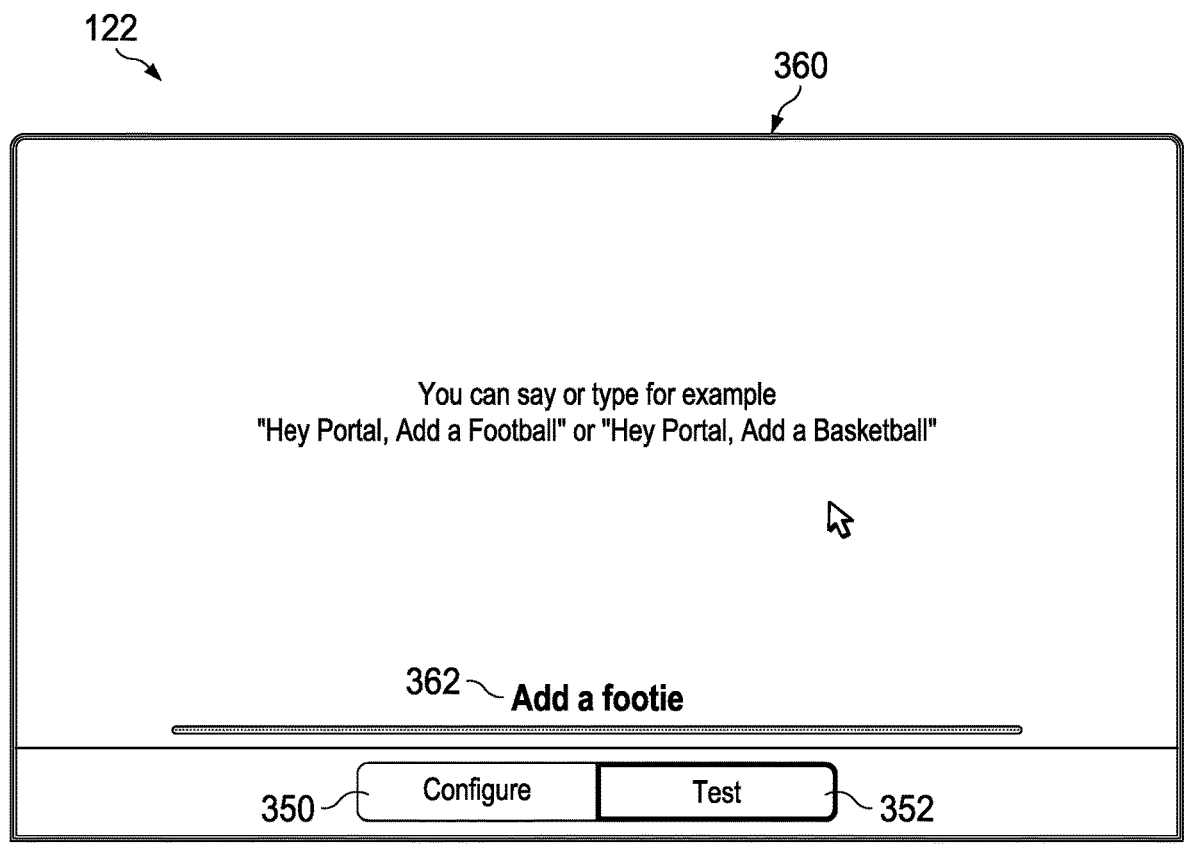

FIG. 3E illustrates the UI 122 in the test phase—e.g., the test interface element 352 is selected (e.g., by the user 130 interacting with the AR design tool 104) to place the AR design tool 104 and the UI 122 in the test phase of the AR effect 120. The UI 122 now includes a testing interface 360 that can detect an utterance 362 (similar to the utterance 140 of FIG. 1). In the illustrated example, the utterance 362 has a value of "Add a footie."

Figure 3F:
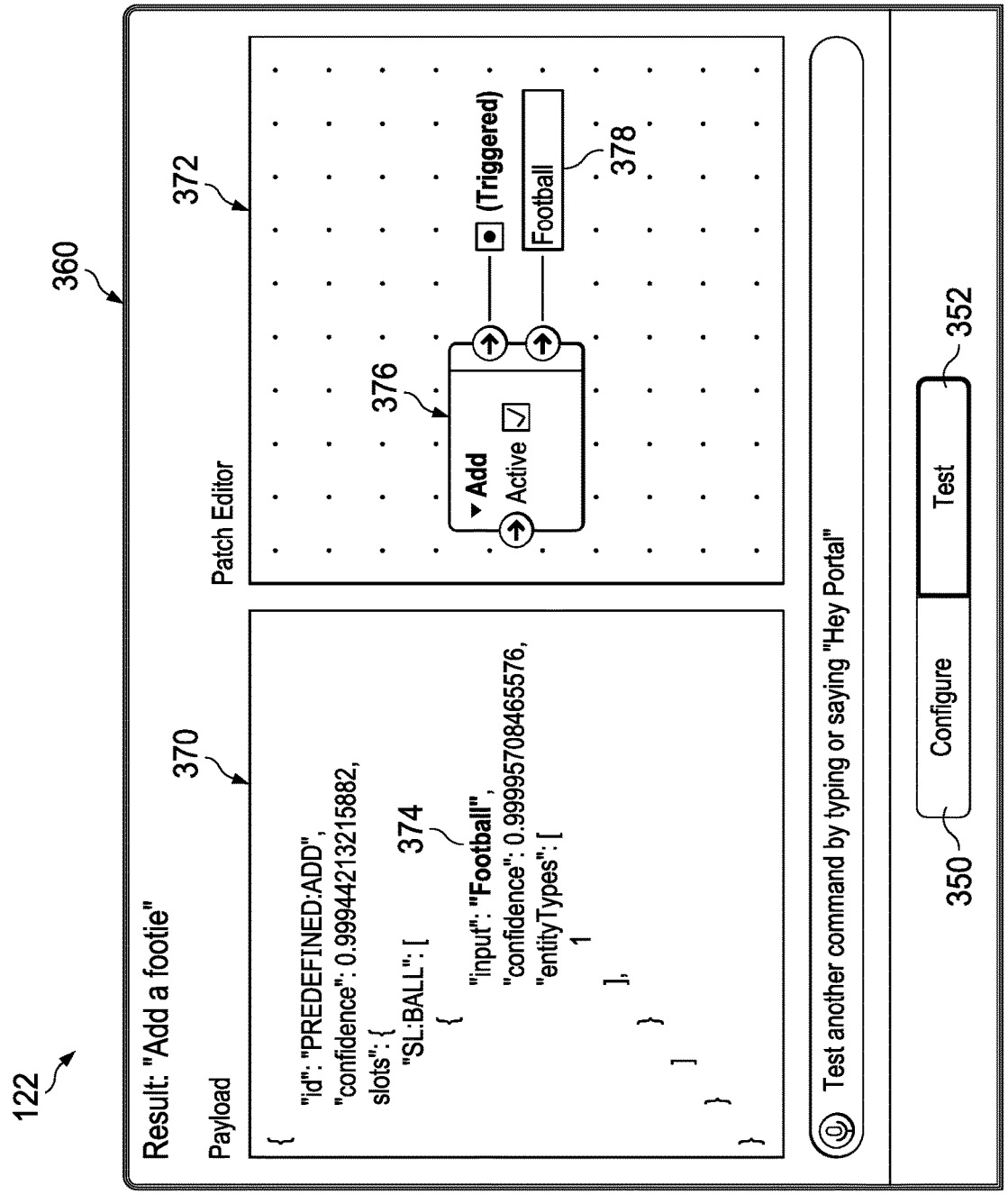

FIG. 3F illustrates the UI 122 including a payload interface 370 and a patch editor interface 372. The payload interface 370 can display the computer-executable programming code 374 related to the AR effect 120, and in particular, the detection of the utterance 140. The patch editor interface 372 can display an executable program 376 (similar to the executable program 108 of FIG. 1) indicating output of a runtime value 378 (similar to the runtime value 142 of FIG. 1) of "Football" based on the detected utterance 362. A logic module (not shown) can receive the runtime value 378.

Figure 7:
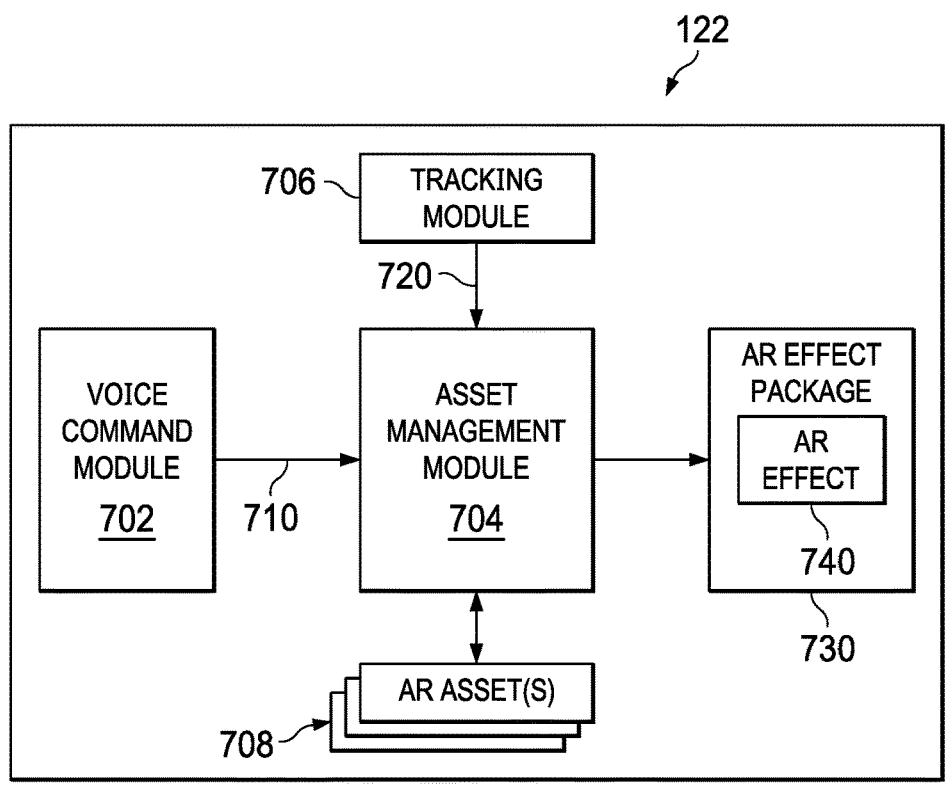
FIG. 7 illustrates the user interface for adding a voice command module to an augmented-reality effect.

FIG. 7 illustrates the UI 122 for adding a voice command module to an AR effect. Specifically, the UI 122 includes a voice command module 702, an asset management module 704, a tracking module 706, and AR asset(s) 708. The voice command module 702 can be similar to the voice command module 110 of FIG. 1.

In some examples, the voice command module 702 provides a runtime value 710 to the asset management module 704. The runtime value 710 can be similar to the runtime value 142 of FIG. 1, or the runtime value 378 of FIG. 3F. For example, the runtime value 710 can have the value of "Football" or "Basketball."

The asset management module 704 can access the AR assets 708 based on the runtime value 710 from the voice command module 702. For example, when the value of the runtime value 710 is "Football," the asset management module 704 can access the AR asset 708 that corresponds to "Football." For example, the AR asset 708 that corresponds to "Football" can include an AR asset of football.

Moreover, the tracking module 706 can identify a specific tracked location of a user (similar to that mentioned above with respect to FIGS. 2A and 2B). The tracking module 706 can provide such tracking values 720 to the asset management module 704. The asset management module 704 can cause the AR asset 708 to be displayed that corresponds to the tracking value 720. For example, when the AR asset 708 includes the "Football" and the tracking value 720 includes a hand of an end-user, the asset management module 704 can cause the "Football" AR asset 708 to be displayed according the tracked value 720 of the user's hand.

The asset management module 704 can generate the AR effect package 730 that includes an AR effect 740. That is, the asset management module 704 can generate the AR effect package 730 that includes the AR effect 740 based on the i) the runtime value 710 and ii) the tracking value 720. The AR effect package 730 can be an executable program that other users can access, that includes the AR effect 740.

Figure 4:
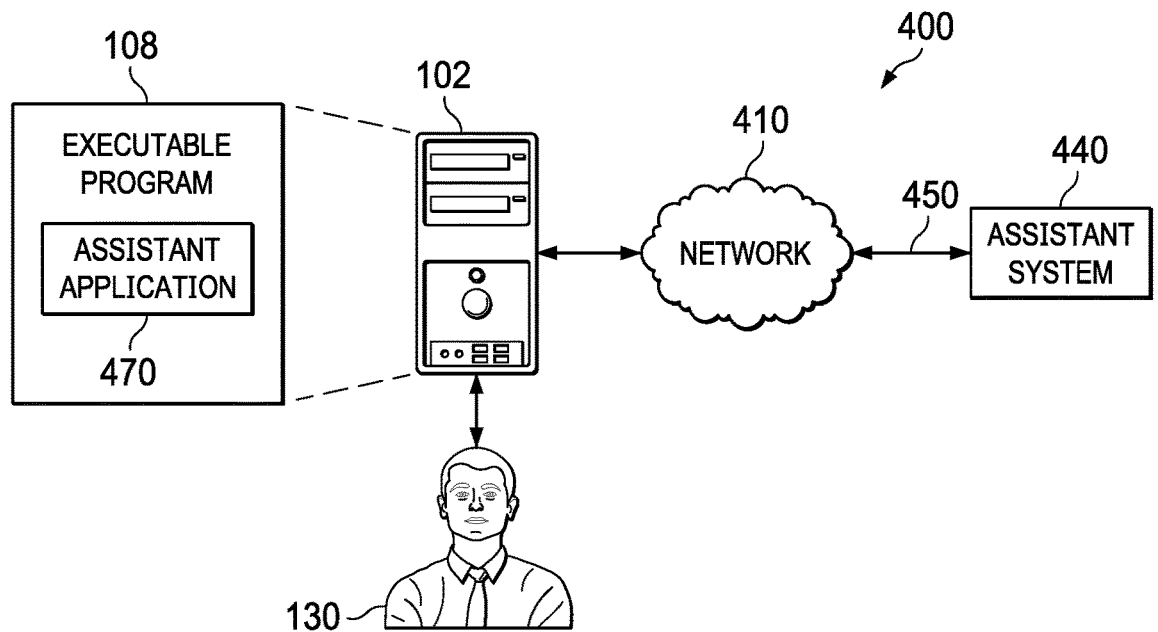
FIG. 4 illustrates an example architecture of a natural language processing system.

FIG. 4 illustrates an example network environment 400 associated with an assistant system. Network environment 400 includes the computing system 102 and an assistant system 440 connected to each other by a network 410. This disclosure contemplates any suitable network 410. As an example and not by way of limitation, one or more portions of a network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 410 may include one or more networks 410.

Links 450 may connect the computing system 102 and the assistant system 440 to a communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout a network environment 400. One or more first links 450 may differ in one or more respects from one or more second links 450.

The computing system 102 can include the executable program 108, as shown in FIG. 1. The executable program 108 can include an assistant application 470. The user 130 at the computing system 102 may use the executable program 108 to employ the assistant system 440 through the assistant application 470. In particular embodiments, the assistant application 470 may comprise a stand-alone application. In particular embodiments, the assistant application 470 may be also integrated into the computing system 102, an assistant hardware device, or any other suitable hardware devices. The assistant application 470 may communicate the user input (utterance 140) to the assistant system 440. Based on the user input (utterance 140), the assistant system 440 may generate responses. The assistant system 440 may use natural-language understanding to analyze the user request (utterance 140). The assistant system 440 may send the generated responses to the assistant application 470, in particular, the assistant system 440 may generate a response by using natural-language generation.

In particular embodiments, the assistant system 440 may assist the user via a hybrid architecture built upon both client-side processes and server-side processes. The client-side processes and the server-side processes may be two parallel workflows for natural language processing providing responses based on such. In particular embodiments, the client-side processes may be performed locally on the computing system 102. By contrast, the server-side processes may be performed remotely on one or more computing systems. In particular embodiments, an assistant orchestrator on the computing system 102 may coordinate receiving input (e.g., audio signal) and determine whether to use client-side processes, server-side processes, or both, to respond to the user input. A dialog arbitrator may analyze the processing results from each process. The dialog arbitrator may instruct agents on the client-side or server-side to execute tasks associated with the user input based on the aforementioned analyses. The execution results may be further rendered as output to the computing system 102.

Figure 5:
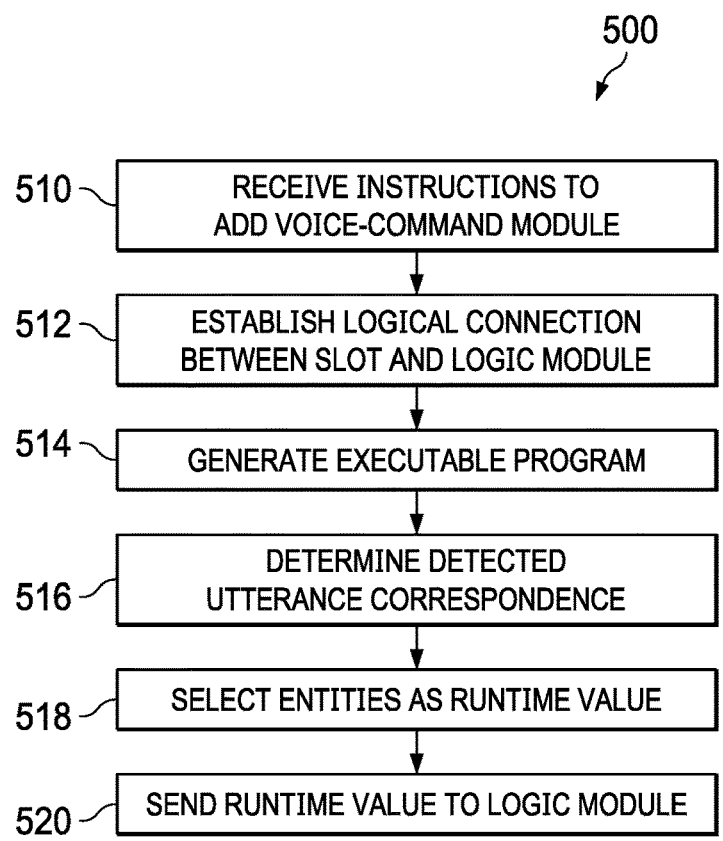
FIG. 5 illustrates an example method for designing augmented-reality effects that utilize voice recognition.

FIG. 5 illustrates an example method 500 for designing an augmented-reality effect using an augmented-reality design editor that utilizes voice recognition. In particular embodiments, the method may begin at, step 510, where the AR design tool 104 can receive, through UI 122, the instructions 121 to add the voice-command module 110 to the AR effect 120. At step 512, the AR design tool 104 can establish, according to the instructions 121 received through the UI 122, a logical connection between the slot 134 and the logic module 106 configured to generate the AR effect 120 depending on the runtime value 142 associated with the slot 134. At step 514, the executable program 108 is generated for the AR effect 120. At step 516, the executable program 108 can be configured to determine that the detected utterance 140 corresponds to the intent type 132 and includes one or more words associated with the slot 134. At step 518, the executable program 108 can be configured to select, based on the one or more words, one of the one or more entities 134 as the runtime value 142 for the slot 134. At step 520, the executable program 108 can be configured to send the runtime value 142 to the logic module 106 according to the logical connection.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for controlling how objects are rendered using an augmented-reality design editor, including the particular steps of the method of FIG. 5, this disclosure contemplates any suitable method for controlling how objects are rendered using an augmented-reality design editor, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
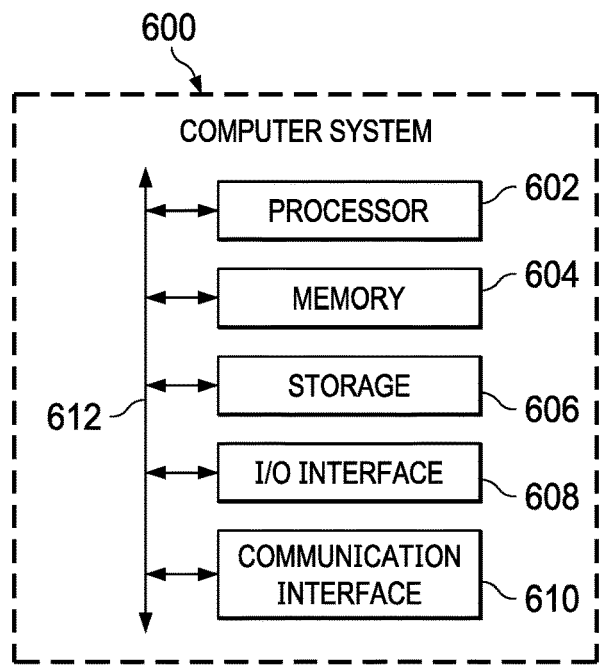
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method, comprising, by an artificial-reality (AR) design tool:
    receiving, through a user interface (UI) of the AR design tool, a selection of a configurable interface element to place the AR design tool and the UI into a configure phase to configure an AR effect;
    receiving, through the UI of the AR design tool after the AR design tool and the UI are placed into the configure phase in response to selecting the configurable interface element, instructions to add a voice-command module to the AR effect, the voice-command module having an intent type and at least one slot, the slot associated with one or more entities;
    establishing, according to instructions received through the UI, a logical connection between the slot and a logic module configured to generate the AR effect depending on a runtime value associated with the slot; and
    generating, for the AR effect, an executable program configured to:
        detect an utterance at runtime;
        determine that the detected utterance at runtime corresponds to the intent type and includes one or more words associated with the slot;

select, based on the one or more words, one of the one or more entities as the runtime value for the slot;
send the runtime value to the logic module according to the logical connection; and
after detecting the utterance at runtime, generate the AR effect based on the runtime value, received over the logical connection, that is selected based on the one or more words that are included by the detected utterance at runtime.

2. The computer-implemented method of claim 1, further comprising:
customizing the voice-command module, wherein the customizing the voice-command module comprises:
receiving, through the UI, one or more additional entities for the slot; and
configuring the slot to be associated with the one or more additional entities.

3. The computer-implemented method of claim 2, wherein selecting the runtime value for the slot further comprises:
selecting, based on the one or more words, one of the one or more additional entities as the runtime value for the slot.

4. The computer-implemented method of claim 1, further comprising:
customizing the voice-command module, including:
receiving, through the UI, an additional slot for the voice-command module;
configuring the additional slot to be associated with one or more additional entities; and
establishing, according to instructions received through the UI, an additional logical connection between the additional slot and the logic module.

5. The computer-implemented method of claim 4, wherein generating the executable program further comprises:
determining that the detected utterance at runtime corresponds to the intent type and includes one or more particular words associated with the additional slot;
selecting, based on the one or more particular words, one of the one or more additional entities as a particular runtime value for the additional slot; and
sending the particular runtime value to the logic module according to the logical connection.

6. The computer-implemented method of claim 1, further comprising:
receiving, through the UI, a selection indicating synonyms of the one or more entities of the slot; and
configuring the slot to be associated with the one or more entities and the synonyms of the one or more entities.

7. One or more computer-readable non-transitory storage media embodying software that is operable when executed to:
receive, through a user interface (UI) of an artificial-reality (AR) design tool, a selection of a configurable interface element to place the AR design tool and the UI into a configure phase to configure an AR effect;
receive, through the UI of the AR design tool after the AR design tool and the UI are placed into the configure phase in response to selecting the configurable interface element, instructions to add a voice-command module to the AR effect, the voice-command module having an intent type and at least one slot, the slot associated with one or more entities;
establish, according to instructions received through the UI, a logical connection between the slot and a logic module configured to generate the AR effect depending on a runtime value associated with the slot; and
generate, for the AR effect, an executable program configured to:
detect an utterance at runtime;
determine that the detected utterance at runtime corresponds to the intent type and includes one or more words associated with the slot;
select, based on the one or more words, one of the one or more entities as the runtime value for the slot;
send the runtime value to the logic module according to the logical connection; and
after detecting the utterance at runtime, generate the AR effect based on the runtime value, received over the logical connection, that is selected based on the one or more words that are included by the detected utterance at runtime.

8. The computer-readable non-transitory storage media of claim 7, wherein the software is further operable whene executed to:
customize the voice-command module, wherein customizing the voice-command module comprises:
receiving, through the UI, one or more additional entities for the slot; and
configuring the slot to be associated with the one or more additional entities.

9. The computer-readable non-transitory storage media of claim 8, wherein selecting the runtime value for the slot further comprises:
selecting, based on the one or more words, one of the one or more additional entities as the runtime value for the slot.

10. The computer-readable non-transitory storage media of claim 7, wherein the software is further operable when executed to:
customize the voice-command module, wherein customizing the voice-command module comprises:
receiving, through the UI, an additional slot for the voice-command module;
configuring the additional slot to be associated with one or more additional entities; and
establishing, according to instructions received through the UI, an additional logical connection between the additional slot and the logic module.

11. The computer-readable non-transitory storage media of claim 10, wherein generating the executable program further comprises:
determining that the detected utterance at runtime corresponds to the intent type and includes one or more particular words associated with the additional slot;
selecting, based on the one or more particular words, one of the one or more additional entities as a particular runtime value for the additional slot; and
sending the particular runtime value to the logic module according to the logical connection.

12. The computer-readable non-transitory storage media of claim 7, wherein the software is further operable when executed to:
receive, through the UI, a selection indicating synonyms of the one or more entities of the slot; and
configure the slot to be associated with the one or more entities and the synonyms of the one or more entities.

13. A system comprising: one or more processors; and a memory coupled to the processors comprising instructions executable by the processors, the processors being operable when executing the instructions to:

receive, through a user interface (UI) of an artificial-reality (AR) design tool, a selection of a configurable interface element to place the AR design tool and the UI into a configure phase to configure an AR effect;

receive, through the UI of the AR design tool after the AR design tool and the UI are placed into the configure phase in response to selecting the configurable interface element, instructions to add a voice-command module to the AR effect, the voice-command module having an intent type and at least one slot, the slot associated with one or more entities;

establish, according to instructions received through the UI, a logical connection between the slot and a logic module configured to generate the AR effect depending on a runtime value associated with the slot; and generate, for the AR effect, an executable program configured to:
  detect an utterance at runtime;
  determine that the detected utterance at runtime corresponds to the intent type and includes one or more words associated with the slot;
  select, based on the one or more words, one of the one or more entities as the runtime value for the slot;
  send the runtime value to the logic module according to the logical connection; and
  after detecting the utterance at runtime, generate the AR effect based on the runtime value, received over the logical connection, that is selected based on the one or more words that are included by the detected utterance at runtime.

14. The system of claim 13, wherein the processors are further operable when executing the instructions to:
  customize the voice-command module, wherein customizing the voice-command module comprises:
    receiving, through the UI, one or more additional entities for the slot; and
    configuring the slot to be associated with the one or more additional entities.

15. The system of claim 14, wherein selecting the runtime value for the slot further comprises:
  selecting, based on the one or more words, one of the one or more additional entities as the runtime value for the slot.

16. The system of claim 13, wherein the processors are further operable when executing the instructions to:
  customize the voice-command module, wherein customizing the voice-command module comprises:
    receiving, through the UI, an additional slot for the voice-command module;
    configuring the additional slot to be associated with one or more additional entities; and
    establishing, according to instructions received through the UI, an additional logical connection between the additional slot and the logic module.

17. The system of claim 16, wherein generating the executable program further comprises:
  determining that the detected utterance at runtime corresponds to the intent type and includes one or more particular words associated with the additional slot;
  selecting, based on the one or more particular words, one of the one or more additional entities as a particular runtime value for the additional slot; and
  sending the particular runtime value to the logic module according to the logical connection.

18. The system of claim 13, wherein the processors are further operable when executing the instructions to:
  receive, through the UI, a selection indicating synonyms of the one or more entities of the slot; and
  configure the slot to be associated with the one or more entities and the synonyms of the one or more entities.

* * * * *